(12) United States Patent
Mewis

(10) Patent No.: US 8,123,578 B2
(45) Date of Patent: Feb. 28, 2012

(54) DEVICE FOR REDUCING THE POWER DEMAND FOR THE PROPULSION OF A SHIP

(75) Inventor: Friedrich Mewis, Dresden (DE)

(73) Assignee: Becker Marine Systems GmbH & Co. (DE)

( * ) Notice: Subject to any disclaimer, the term of this patent is extended or adjusted under 35 U.S.C. 154(b) by 241 days.

(21) Appl. No.: 12/381,149

(22) Filed: Mar. 7, 2009

(65) Prior Publication Data

US 2009/0229506 A1    Sep. 17, 2009

(30) Foreign Application Priority Data

Mar. 10, 2008 (DE) .................... 20 2008 003 367 U
May 2, 2008 (DE) .................... 20 2008 006 069 U
Jun. 17, 2008 (EP) ......................... 08010940
Feb. 26, 2009 (DE) .................... 20 2009 002 642 U

(51) Int. Cl.
*B63H 1/18* (2006.01)

(52) U.S. Cl. .................... 440/66; 444/67

(58) Field of Classification Search ............ 440/66, 440/67, 68, 69, 70, 71, 72, 73; 416/247 A, 416/247 R
See application file for complete search history.

(56) References Cited

U.S. PATENT DOCUMENTS

| | | | |
|---|---|---|---|
| 3,455,268 A * | 7/1969 | Gordon ............................ | 440/67 |
| 3,675,424 A * | 7/1972 | Oosterveld ....................... | 440/67 |
| 4,288,223 A | 9/1981 | Gonzalez et al. | |
| 4,631,036 A | 12/1986 | Grothues-Spork | |
| 4,694,645 A * | 9/1987 | Flyborg et al. .................. | 440/67 |
| 5,752,865 A | 5/1998 | Ishii et al. | |
| 5,906,522 A * | 5/1999 | Hooper ............................ | 440/66 |
| 6,986,689 B2 * | 1/2006 | Norman ........................... | 440/67 |
| 7,229,331 B2 * | 6/2007 | Norman et al. .................. | 440/66 |
| 7,267,589 B2 * | 9/2007 | Norman ........................... | 440/67 |

FOREIGN PATENT DOCUMENTS

| | | |
|---|---|---|
| DE | 8314111 U1 | 2/1984 |
| DE | 3324753 A1 | 1/1985 |
| DE | 3615619 A1 | 1/1987 |
| DE | 42 23 570 | 9/1993 |
| EP | 0470339 A1 | 2/1992 |
| EP | 1955944 A1 | 8/2008 |
| GB | 2119732 A | 11/1983 |
| GB | 2177365 A | 1/1987 |
| JP | 46-006748 A | 2/1971 |
| JP | 47-020860 | 6/1972 |
| JP | 54-003797 A | 1/1979 |
| JP | 56-032154 B2 | 4/1981 |
| JP | 56-032396 Y2 | 4/1981 |
| JP | 57-022994 A | 2/1982 |
| JP | 57-026086 A | 2/1982 |
| JP | 57-026087 A | 2/1982 |
| JP | 57-158191 A | 9/1982 |
| JP | 58-004695 A | 1/1983 |

(Continued)

*Primary Examiner* — Lars A Olson
(74) *Attorney, Agent, or Firm* — Kelly & Kelley, LLP

(57) ABSTRACT

A device for reducing the power demand for the propulsion of a ship, and for broad-built or non-broad-built not-very-fast ships of any type which is affixed to the hull at a short distance upstream of the propeller, comprises a fore-nozzle with fins or hydrofoils that are arranged within the fore-nozzle, wherein the fore-nozzle, at the top, can be tilted forwards by up to 8°, on a horizontal transverse axis that extends through the centre of the fore-nozzle.

14 Claims, 10 Drawing Sheets

FOREIGN PATENT DOCUMENTS

| | | |
|---|---|---|
| JP | 58-016981 A | 1/1983 |
| JP | 58000492 | 1/1983 |
| JP | 58-194691 A | 11/1983 |
| JP | 60-127299 U | 7/1985 |
| JP | 61-036499 U | 3/1986 |
| JP | 61-203199 U | 9/1986 |
| JP | 62-016879 B2 | 1/1987 |
| JP | 63-173791 A | 7/1988 |
| JP | 04-043193 A | 2/1992 |
| JP | 05-185986 A | 7/1993 |
| JP | 06-243898 A | 9/1994 |
| JP | 07267189 | 10/1995 |
| JP | 09-175488 A | 7/1997 |
| JP | 2004-130908 A | 4/2004 |
| JP | 2006-347519 A | 12/2006 |
| KR | 1020060108472 A | 10/2006 |

\* cited by examiner

DEVICE FOR REDUCING THE POWER DEMAND FOR THE PROPULSION OF A SHIP

BACKGROUND OF THE INVENTION

1. Field of the Invention

The present invention relates to a device for reducing the power demand for the propulsion of a single-propeller or multi-propeller ship, in particular for broad-built or non-broad-built ships that are not very fast.

2. Description of the Related Art

From DE 42 23 570 C1 discloses a flow guide surface for a controllable-pitch propeller is known. This flow guide surface includes a ring-shaped nozzle that is arranged upstream to influence the flow in the manner of a diffuser. To this effect deceleration of the flow in the near region, and acceleration of the flow in the outer region is carried out. The diffusor diameter is smaller than 65% of the propeller diameter. Such a nozzle is designed as a deceleration nozzle or diffuser with an outwardly curved ring-shaped nozzle. This diffusor decelerates the flow in its region, which can only result in an improvement of propulsion efficiency if very thick hubs are used, such as in the case of controllable-pitch propellers. Such a nozzle is thus not designed as an acceleration nozzle with an inwards curvature of the ring-shaped nozzle. The nozzle presented in the above-mentioned printed publication thus does not accelerate the flow in its region, and is not suitable for all propeller types, in particular it is not suitable for fixed propellers. DE 42 23 570 C1 does not describe an effective principle of a fore-nozzle, which principle consists of increasing the propeller flow speed in regions where the main stream is very high.

JP 07 267189 A discloses a propeller arrangement with a ring-shaped nozzle and fins that are arranged in a star-shape. The propeller diameter approximately corresponds to the ring diameter of the nozzle.

JP 58 000492 A shows a further propeller arrangement which is said to result in an improvement in the efficiency and a reduction in the power demand for propulsion. This arrangement also comprises fins, as well as a structure comprising six elements arranged in a honeycomb-like manner.

SUMMARY OF THE INVENTION

It is the object of the present invention to create a device that serves to reduce the power demand for the propulsion of a ship. Furthermore, an improvement in the efficiency, and matching of the fins or hydrofoils to the flow are to be achieved. Moreover, the flow against the propeller is to be improved.

In accordance with the present invention, the device is constructed in such a way that the device, which is attached to the hull at a short distance from the propeller, comprises a fore-nozzle with fins or hydrofoils that are arranged within the fore-nozzle, wherein the fore-nozzle, at the top, can be tilted forwards, preferably by up to 8°, on a horizontal transverse axis that extends through the center of the fore-nozzle.

With a device constructed in this manner it is possible to reduce the power demand for the propulsion of a ship. The possible gain increases as the extent of thrust loading on the propeller increases. The device is particularly suitable for slow, broad-built ships, such as tankers, bulk transports and tugs, and also for not-very-fast ships of any type. The device itself is affixed to the hull so that it is upstream of the propeller of the ship, with said device comprising the two functional elements of fore-nozzle and fins or hydrofoils.

In this arrangement the effective principle of the fore-nozzle consists of increasing the speed of the flow against the propeller in areas where the main stream is very high, and of decreasing the flow against the propeller in areas where the main stream is low, wherein the nozzle itself generates thrust, while the effective principle of the fins or hydrofoils arranged within the fore-nozzle consists of generating a pre-swirl, wherein both functional elements target different sources of losses, namely the fore-nozzle aims at a reduction in the effective thrust loading, and the fins or hydrofoils target a reduction in the swirl losses in the propeller stream. Both effects result in an increase in the efficiency of the propulsion system.

As a result of the device being affixed as closely as possible upstream of the propeller, the best-possible effect is achieved, even in different load cases.

In addition to the above, the device according to the invention is not only suitable for broad-build ships; it can be used to the same effect in the case of all ships that are not very fast, for example $V \leqq 25$ kn. The use of the device in very large container ships is also possible.

In order to achieve the best-possible effect, the trailing edge of the device or of the fore-nozzle is affixed no further than 0.3 times the propeller diameter upstream of the propeller plane. Preferably, at the top, the fore-nozzle is tilted forwards by approximately 4°.

According to a further embodiment, the fore-nozzle is laterally rotated, on a vertical axis that preferably extends through the centre of the fore-nozzle, such that the fore-nozzle is tilted forwards on the upwards-beating side of the propeller.

The invention further provides for the fore-nozzle to be laterally rotated by up to 3°, preferably by 1°, on a vertical axis that preferably extends through the centre of the fore-nozzle, such that the fore-nozzle is rotated forwards on the upwards-beating side of the propeller, wherein rotation can also be 0°, but not in the other direction.

Furthermore, the invention provides for the thickness of the profile of the fore-nozzle to be less than 12% of its length. Advantageously, the thickness of the profile of the fore-nozzle can be 7.5% or 9% of its length.

A further embodiment provides for the fins or hydrofoils in radial direction to comprise a variable angle of incidence, wherein the fins or hydrofoils are twisted such that said fins or hydrofoils on the inside of the ship are directed upwards, with the angle of incidence decreasing on the outside towards the fore-nozzle.

Thus the fore-nozzle is rotation-symmetrically arranged with an upwards-shifted axis that is preferably situated above the propeller axis, wherein the internal diameter of the fore-nozzle is at most 90% of the propeller diameter.

Preferably, four fins or hydrofoils are arranged asymmetrically within the fore-nozzle, and radially to the propeller axis, wherein the fins or hydrofoils connect the hull to the fore-nozzle and are arranged at the rear end of the fore-nozzle, wherein the curved side of the hydrofoil-shaped and also lenticular cross-sectional profile of the fin or of the hydrofoil is directed upwards on the upwards-beating side of the propeller, and is directed downwards on the downwards-beating side of the propeller. However, the arrangement of four fins or hydrofoils in the interior space of the fore-nozzle is not to be interpreted as a limitation; it is also possible for a smaller number or a greater number of fins or hydrofoils to be provided.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
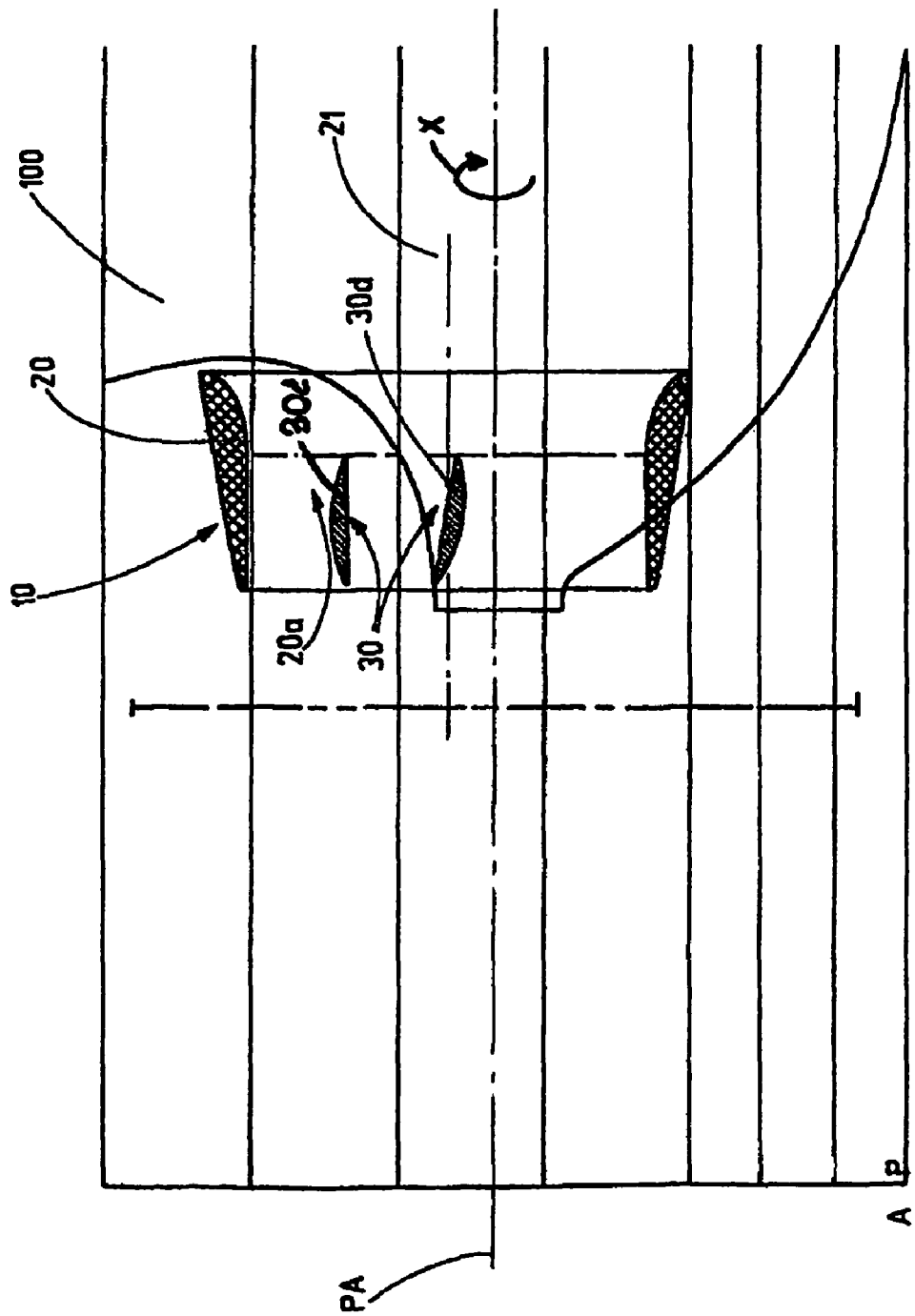
FIG. 1 is a lateral view from starboard the device according to the invention, which device comprises a fore-nozzle with fins or hydrofoils that are arranged in the interior space of said device.

According to FIG. 1, in the device 10 according to the invention, a fore-nozzle 20 of a cylindrical shape or some other shape or cross-section is provided directly upstream of the propeller (not shown in the drawing) of a hull 100, which fore-nozzle 20 if affixed to the hull. In the interior space 20*a* of the fore-nozzle 20, fins or hydrofoils 30 are arranged. The fore-nozzle 20 is arranged on the hull so as to be rotationally symmetrical with its axis 21 shifted upwards.

Figure 2:
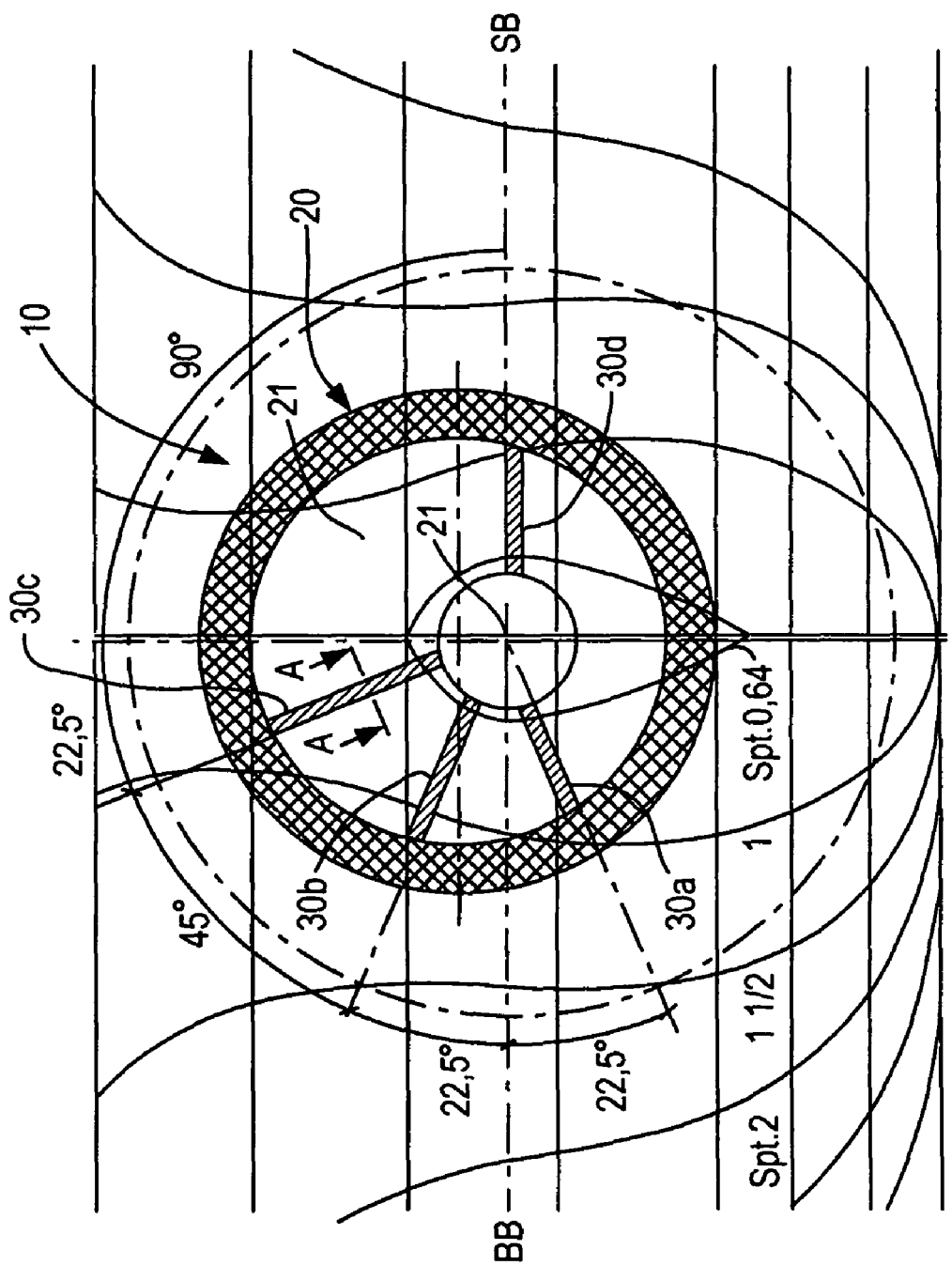
FIG. 2 is a rear view of the device, wherein the fins or hydrofoils are shown without incidence.
Figure 3:
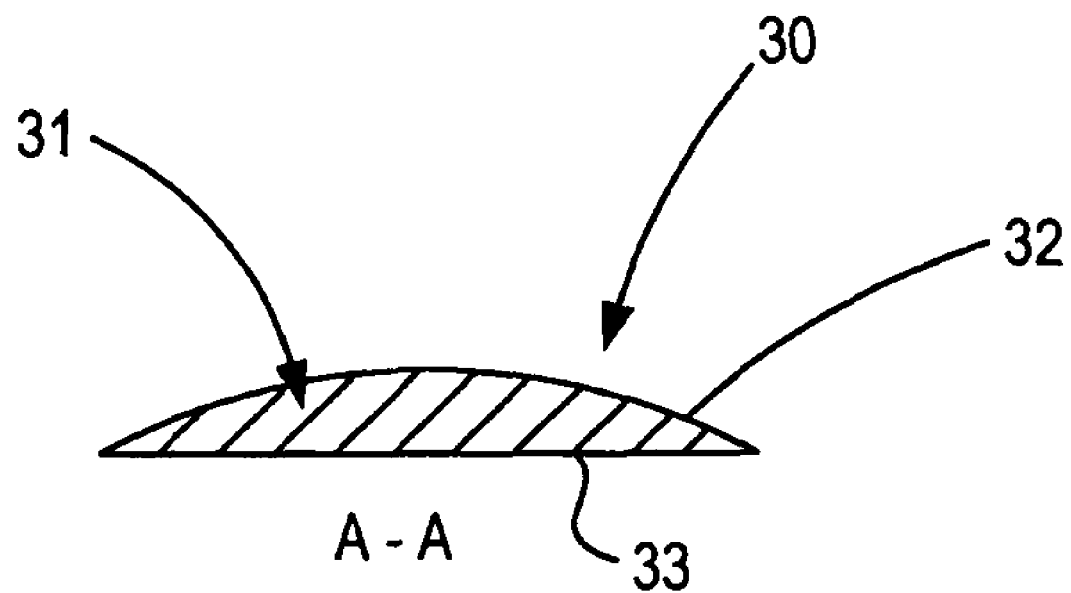
FIG. 3 is an enlarged cross-section of the profile of a fin or a hydrofoil.
Figure 4:
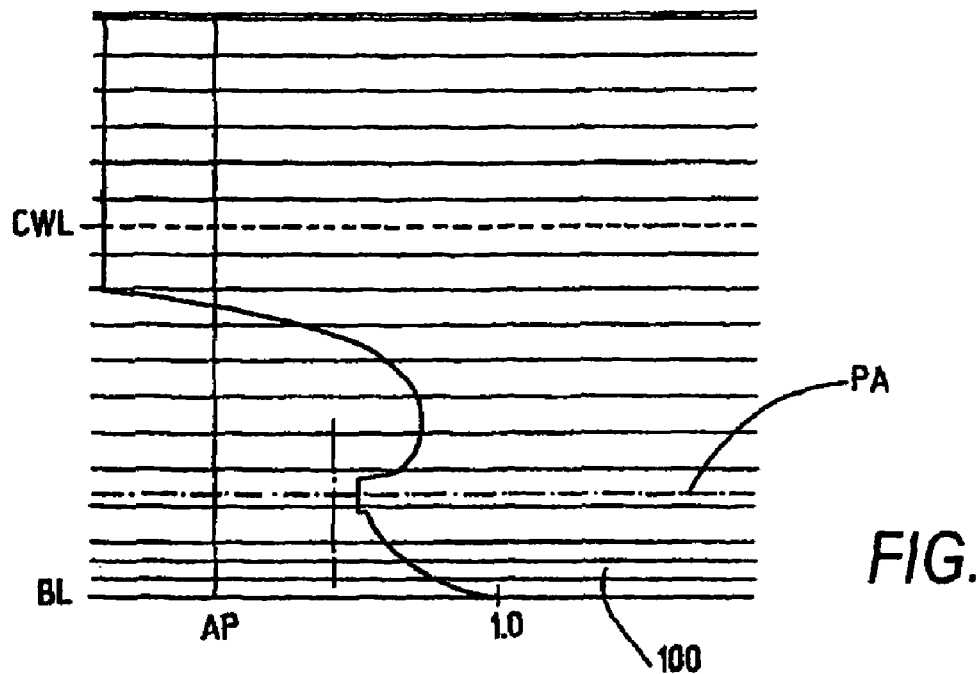
FIG. 4 is a lateral view of the stern contour.
Figure 5:
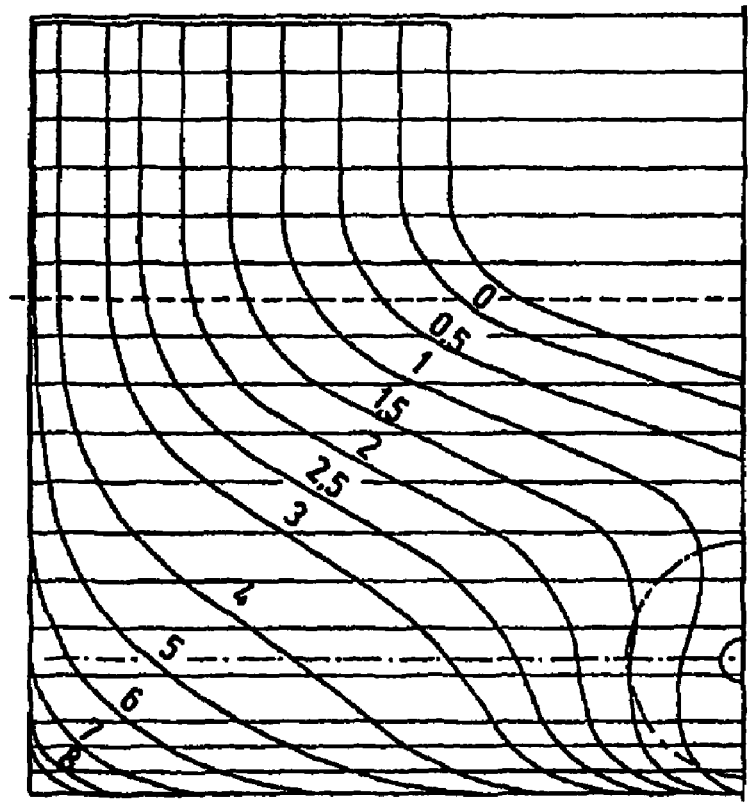
FIG. 5 is a body plan of the after-body.

In the exemplary embodiment shown in FIG. 2, four fins or hydrofoils 30*a*, 30*b*, 30*c*, 30*d* with different fin lengths or hydrofoil lengths are arranged in the interior space 20*a* of the fore-nozzle 20. These four fins or hydrofoils are arranged asymmetrically within the fore-nozzle and radially to the propeller axis PA. In this arrangement the fins or hydrofoils 30*a*, 30*b*, 30*c*, 30*d* connect the fore-nozzle 20 to the hull 100, and are arranged at the rear end of the fore-nozzle 20, which rear end faces the propeller, wherein the curved side 32 of the hydrofoil-shaped or lenticular cross-sectional profile 31 of the fins or of the hydrofoils 30, 30*a*, 30*b*, 30*c*, 30*d* is directed upwards on the port side of the ship or on the upwards-beating side of the propeller, and is directed downwards on the starboard side of the ship or on the downwards-beating side of the propeller. Furthermore, the fins or hydrofoils 30*a*, 30*b*, 30*c*, 30*d* are directed upwards at the front on the port side, and downwards at the front on the starboard side (FIGS. 2 and 3). The direction of rotation of the propeller is in the direction of the arrow X (FIG. 1). The angular positions of the fins or hydrofoils 30, 30*a*, 30*b*, 30*c*, 30*d* that are arranged in the interior space 20*a* of the fore-nozzle 20 are adjustable, and their set angular positions are lockable.

According to an exemplary embodiment with the propeller rotating upwards to starboard, the fins or hydrofoils 30*a*, 30*b*, 30*c*, 30*d* assume the following preferred radial angular positions and initial angular positions:

|  |  | Fin angle | Angle of incidence |
|---|---|---|---|
| Port (BB) | Bottom fin (30a) | 247.5° | 14° |
| Port (BB) | Middle fin (30b) | 292.5° | 12° |
| Port (BB) | Top fin (30c) | 337.5° | 8° |
| Starboard (SB) | Fin (30d) | 90.0° | 10° | namely at a fin angle definition, viewed from behind, of: 12 o'clock=0° increasing clockwise, wherein the fin angles and the angles of incidence can deviate from the values stated.

Figure 6:
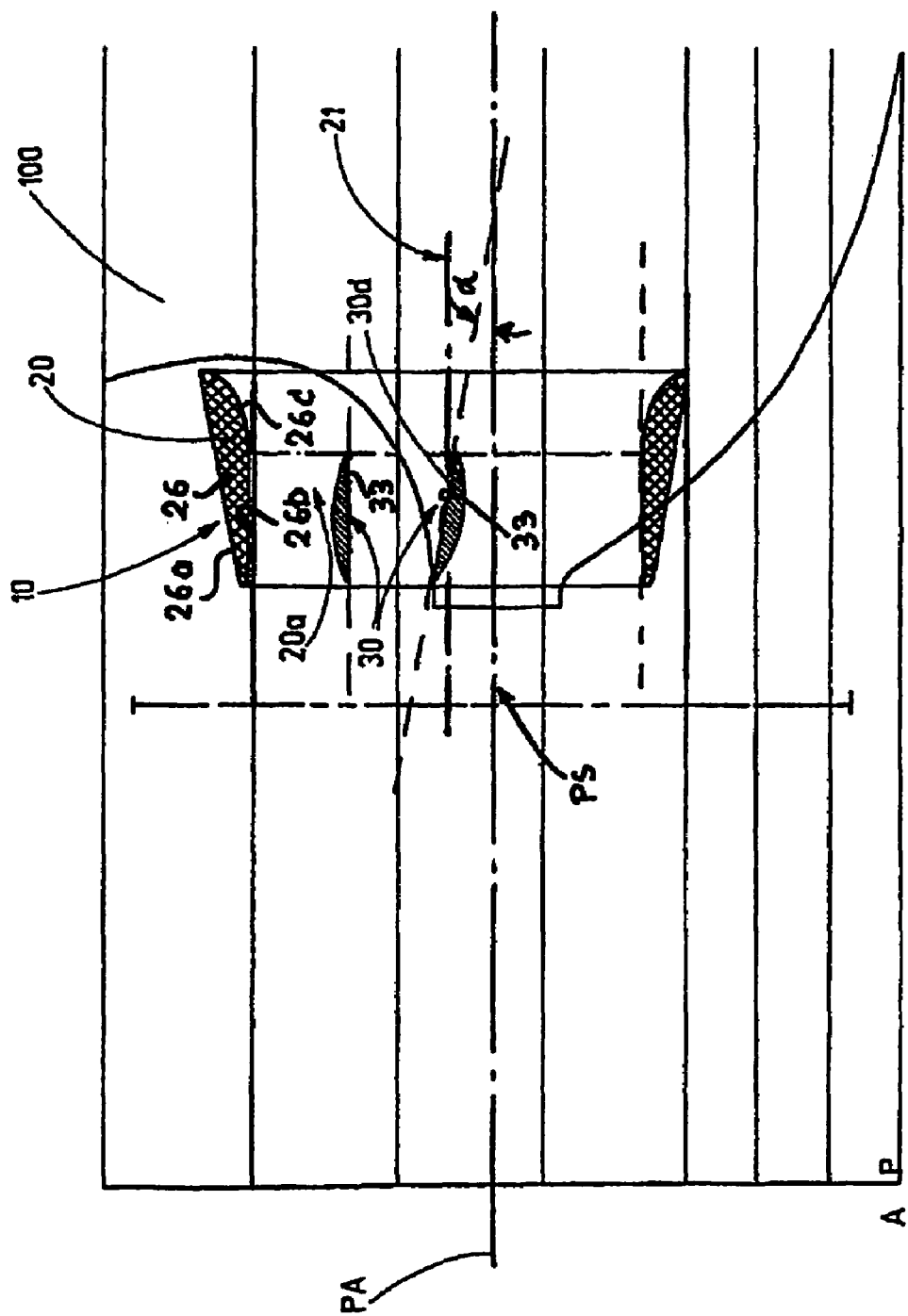
FIG. 6 shows the fore-nozzle with fins or hydrofoils according to FIG. 1, arranged in its interior space, with position arrangements of the fins.

According to the embodiment shown in FIGS. 1, 3 and 6, the fins or hydrofoils comprise a lenticular cross-sectional profile 31 with a curved sidewall 32 and with a straight base area 33. In this setup the arrangement and the position, for example, of the two fins 30 relative to the propeller axis PA are such that the base area 33 of the top fin extends approximately parallel to the propeller axis PA, whereas the lower fin assumes a position in which its base area 33 extends at an angle □ of at least 5°, preferably of 10°, relative to the propeller axis PA. Other angular positions of the fins are possible. Overall, preferably the fins 30*a*, 30*b*, 30*c*, 30*d* are in the positions shown in FIG. 2.

The fore-nozzle 20 according to FIGS. 1 and 6 comprises a shaped body 25 with a cross-sectional profile 26 with a wall section 26*a* that is situated on the outside and that extends so as to be inclined at an angle to the propeller axis PA, and a wall section 26*b* that is situated on the inside and that extends in a straight line and parallel to the propeller axis PA, which wall section 26*b* in the region facing away from the propeller comprises a curved wall section 26*c* that makes a transition to the outside wall section 26*a*. The wall section 26*a* that is situated on the outside can also be curved. The propeller side is indicated at PS in FIG. 6.

Figure 7:
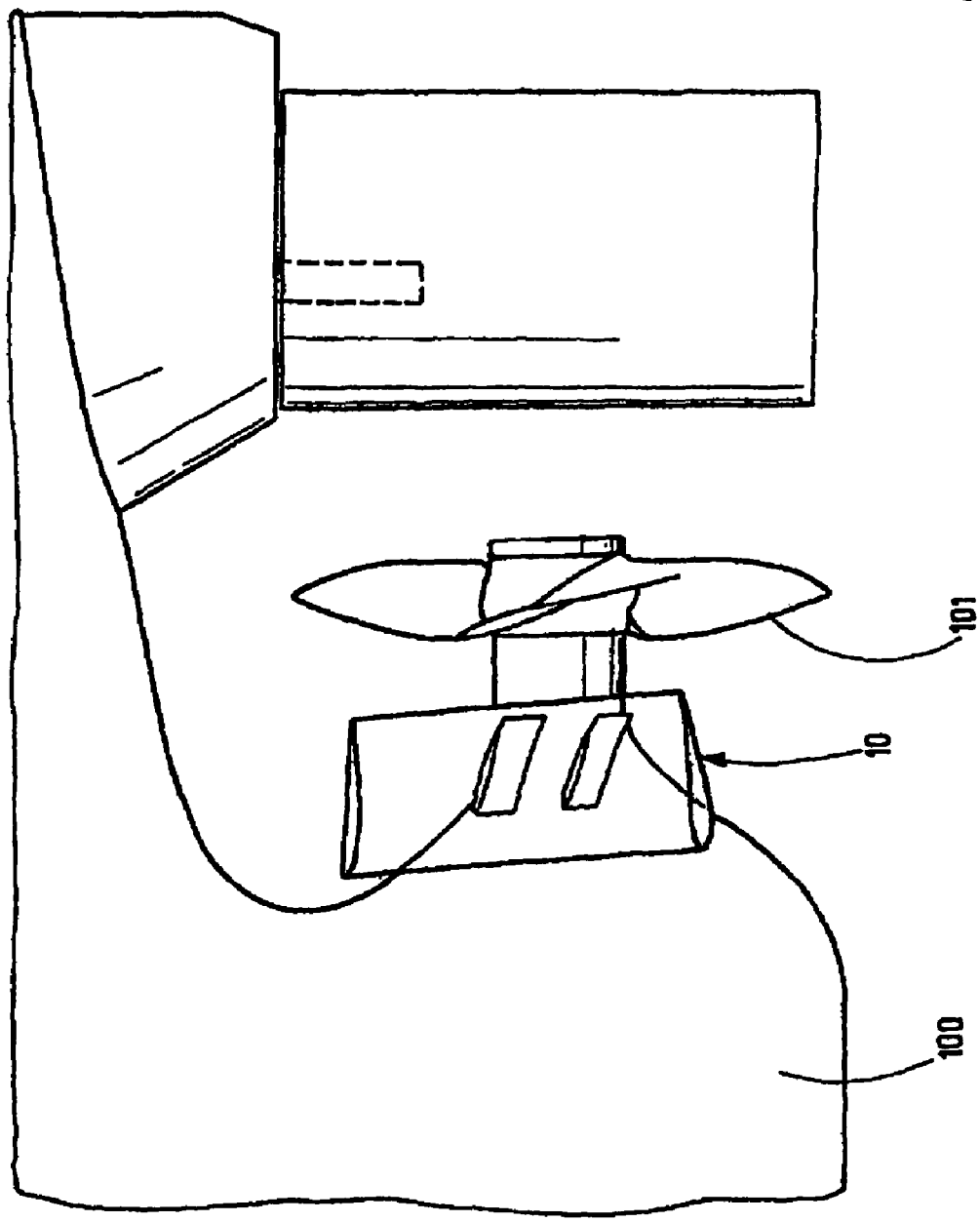
FIG. 7 is a lateral view of the device with the fore-nozzle at the top being tilted forwards by 4°.

As shown in FIG. 7, the device 10 has been affixed to the hull 100 with little distance upstream of the propeller 101. In this arrangement the device 10 is to be arranged as closely as possible upstream of the propeller 101. In this arrangement the fore-nozzle 20 is arranged on a horizontal transverse axis that preferably extends through the centre of the fore-nozzle, preferably so that at the top it is rotated forwards by up to 8°. In FIG. 7 the top of the fore-nozzle 20 is tilted forwards by 4°. In this arrangement the trailing edge of the fore-nozzle 20 is affixed no further than 0.3 times the propeller diameter upstream of the propeller plane.

Furthermore, the fore-nozzle 20 is rotatable, on a vertical axis that preferably extends through the centre of the fore-nozzle, laterally, e.g. by up to 3°, such that the fore-nozzle is rotated forwards on the upwards-beating side of the propeller 101. In this arrangement rotations of up to 1° appear to be optimal. Rotation of 0° can also be applicable, but not in the other direction.

The thickness of the profile of the fore-nozzle 20 is less than 12% of its length. Preferably, the thickness of the profile of the fore-nozzle 20 is 7.5% or 9% of its length.

Figure 8:
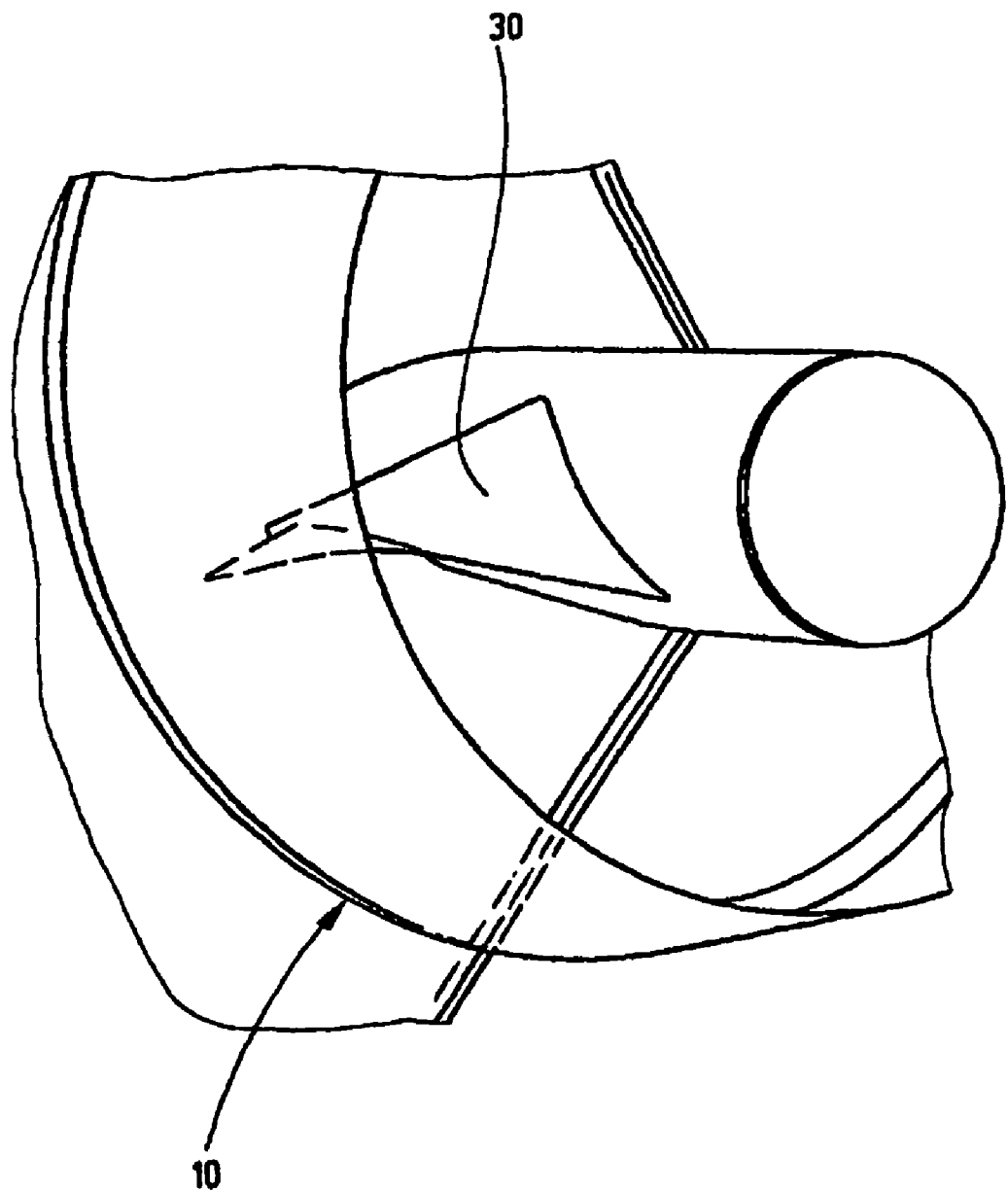
FIG. 8 is a view of the fore-nozzle with the fins on the inside of the ship being directed upwards and twisted.

The fins or hydrofoils 30, 30*a*, 30*b*, 30*c*, 30*d* in radial direction can comprise a variable angle of incidence, wherein the fins or hydrofoils are twisted such that said fins or hydrofoils on the inside of the ship are directed upwards, with the angle of incidence decreasing on the outside towards the fore-nozzle 20 (FIG. 8).

The thickness design of the profile of the fore-nozzle 20, and the design according to which the fins or hydrofoils 30, 30a, 30b, 30c 30d in radial direction comprise a variable angle of incidence are indispensable for very broad-built ships; they can also be used with fast ships.

Figure 9:
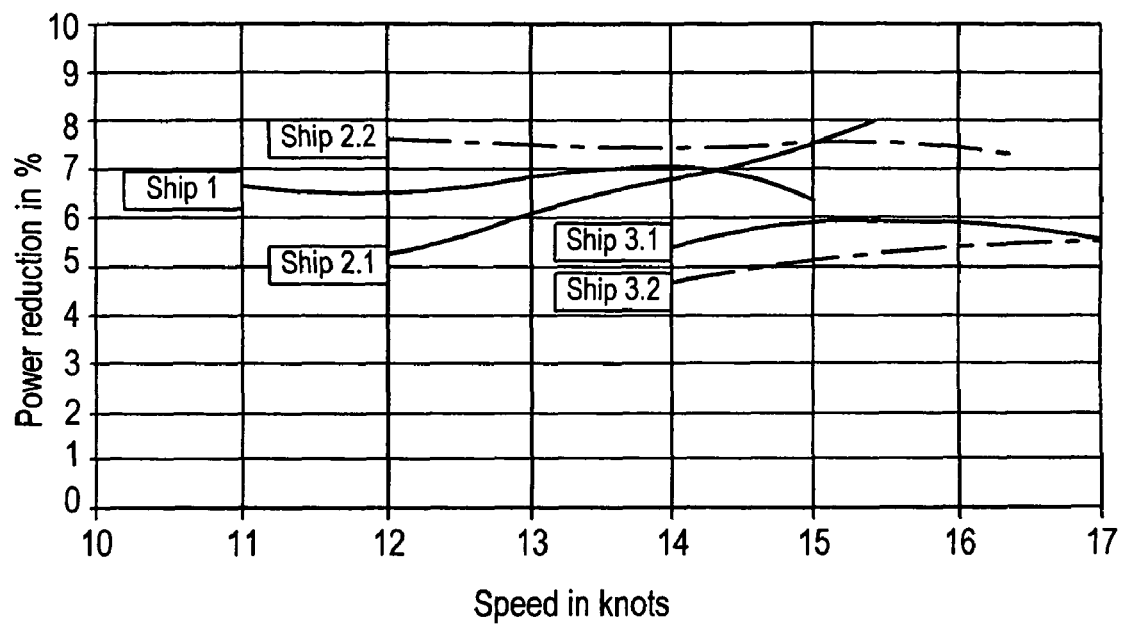
FIG. 9 is a diagram showing power savings with the use of the device according to the invention.

The design, according to the invention, of the device 10 results in significant power savings, as is evident from the diagram of FIG. 9, which shows the power savings with the use of the device 10 in relation to three ships, of which two ships have different drafts (X=design speed).

Figure 10:
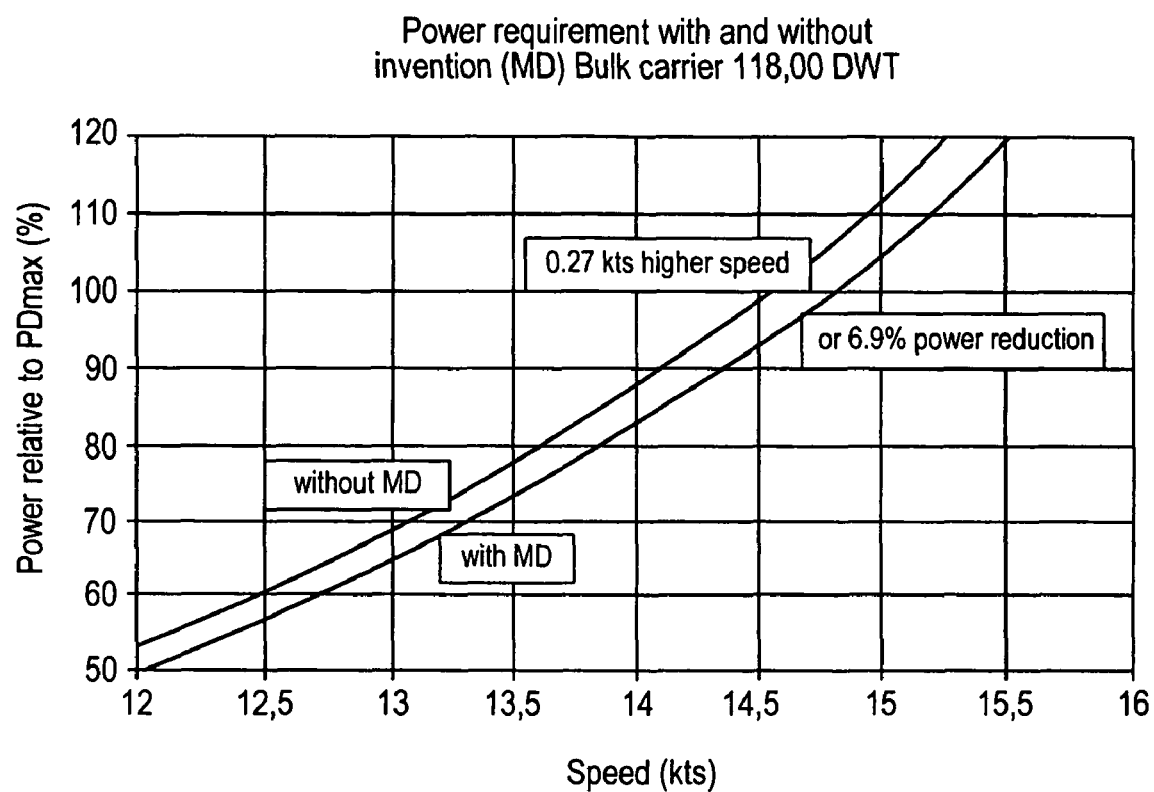
FIG. 10 is a diagram showing the power demand with and without the device according to the invention.

The diagram according to FIG. 10 shows the power demand of a bulk carrier of a deadweight capacity of 118,000 DWT with and without the device 10.

Particularly high gains are, for example in ships of 12,000 DWT, to be attributed to a thick hub in the case of a controllable-pitch propeller, whose losses are reduced by means of the device 10.

Figure 11:
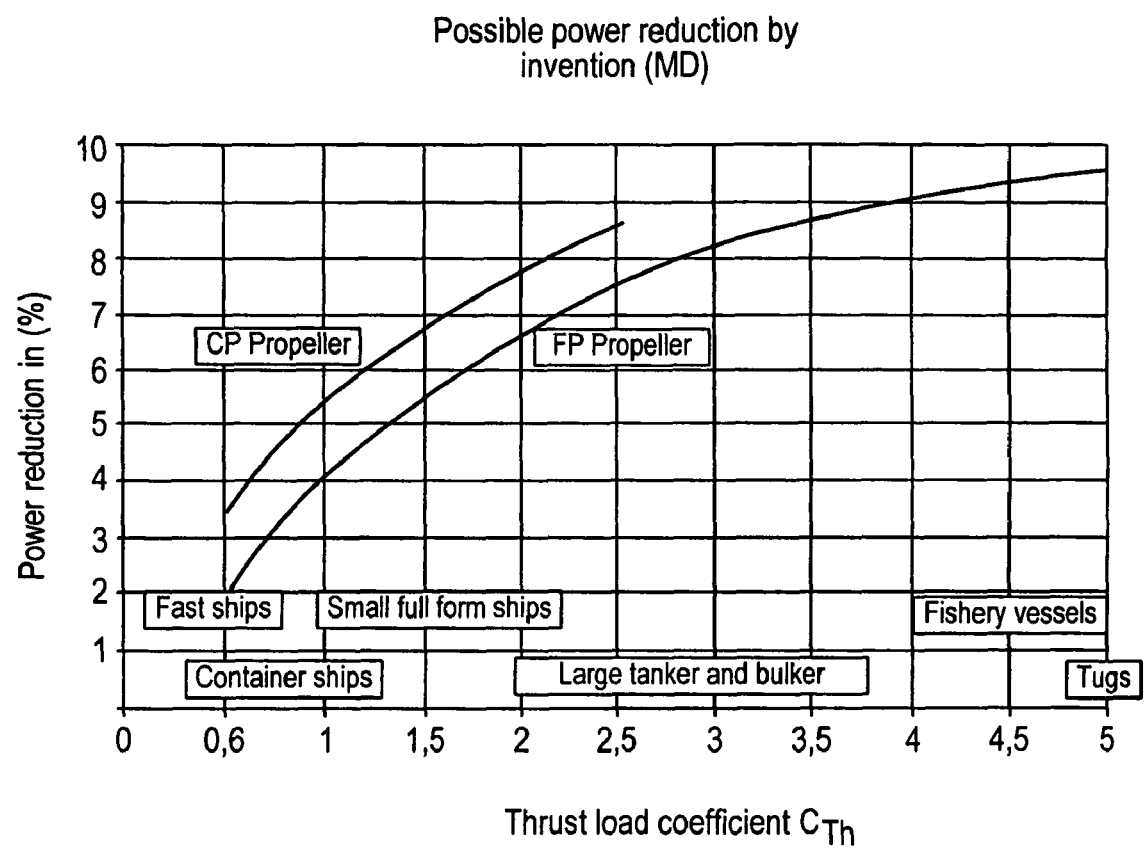
FIG. 11 is a diagram showing power savings with the use of the device according to the invention with various types of ships.

The extent of thrust loading is particularly great in the case of very large slow ships. The diagram of FIG. 11 shows the possible power savings with the use of the device 10 depending on the $C_{Th}$-value. The lower part of FIG. 11 provides an allocation to ship types.

The device according to the invention is characterised by the features stated in the description and the claims, and by the embodiments shown in FIGS. 1 to 11 of the drawings.

With the device 10 a novel device improving the propulsion for broad-built slow ships has been developed due to which fuel is being saved or ships can be quicker. The device consists of two elements mounted fixedly on the ship: a nozzle directly in front of the propeller and a fin system integrated therein. The nozzle improves the propeller afflux in the area of unfavourable wake and produces itself thrust; the fin system reduces the losses in the propeller jet and in the propeller boss swirl due to preswirl production so that the propeller thrust is increasing for the same driving power. The effects are complementary.

The power savings which can be achieved by the device depend substantially on the propeller load, they are from 3% for small multi-purpose ships to 9% for big tankers and bulkers. The power savings are almost independent of the draught of the ship and from the speed. The device is convenient for new ships and for subsequent equipment.

While specific embodiments of the invention have been shown and described in detail to illustrate the inventive principles, it will be understood that the invention may be embodied otherwise without departing from such principles.

I claim:

1. A device for reducing a power demand for the propulsion of a single-propeller or multi-propeller ship, wherein the device is attached to a hull of the ship proximate to the propeller, the device comprising a fore-nozzle with fins or hydrofoils arranged within the fore-nozzle, wherein the fore-nozzle, at a top thereof, is tilted forwards relative to a horizontal transverse axis that extends through the center of the fore-nozzle, wherein the fore-nozzle is rotation-symmetrically arranged with an upwards-shifted axis that is situated above the propeller axis, and wherein the fins or hydrofoils have different lengths.

2. The device according to claim 1, wherein a trailing edge of the device or fore-nozzle is affixed no further than 0.3 times the propeller diameter upstream of the propeller plane.

3. The device according to claim 1, wherein the fore-nozzle, at the top, is tilted forwards by approximately 4°.

4. The device according to claim 1, wherein the fore-nozzle, at the top, is tilted forwards by approximately 8°.

5. The device according to claim 1, wherein the fore-nozzle is laterally rotated, on a vertical axis that extends through the centre of the fore-nozzle, such that the fore-nozzle is shifted forwards on an upwards-beating side of the propeller.

6. The device according to claim 4, wherein the fore-nozzle is laterally rotatable by up to 3° on a vertical axis that extends through or near the center of the fore-nozzle, such that the fore-nozzle is rotated forwards relative to the upwards-beating side of the propeller.

7. The device according to claim 6, wherein the fore-nozzle is laterally rotatable by 1°.

8. The device according to claim 1, wherein the thickness of the profile of the fore-nozzle is less than 12% of its length.

9. The device according to claim 8, wherein the thickness of the profile of the fore-nozzle is 7.5% or 9% of its length.

10. The device according to claim 1, wherein the fins or hydrofoils in radial direction comprise a variable angle of incidence, wherein the fins or hydrofoils are twisted such that said fins or hydrofoils on the inside of the ship are directed upwards, with an angle of incidence decreasing on the outside towards the fore-nozzle.

11. The device according to claim 1, wherein an internal diameter of the fore-nozzle is less than 90% of the propeller diameter.

12. The device according to claim 1, wherein four fins or hydrofoils are arranged asymmetrically in the interior space of the fore-nozzle and radially to the propeller axis, wherein the fins or hydrofoils connect the hull to the fore-nozzle and are arranged at the rear end of the fore-nozzle, wherein a curved side of a lenticular cross-sectional profile of the fin or of the hydrofoil is directed upwards on an upwards-beating side of the propeller, and is directed downwards on a downwards-beating side of the propeller.

13. The device according to claim 1, wherein the fins or hydrofoils assume the following preferred radial angular positions and initial angular positions:

|  |  | Fin angle | Angle of incidence |
| --- | --- | --- | --- |
| Port (BB) | Bottom fin (30a) | 247.5° | 14° |
| Port (BB) | Middle fin (30b) | 292.5° | 12° |
| Port (BB) | Top fin (30c) | 337.5° | 8° |
| Starboard (SB) | Fin (30d) | 90.0° | 10°. |

14. The device according to claim 1, wherein the angular positions of the fins or hydrofoils arranged in the interior space of the fore-nozzle are changeable or adjustable.

* * * * *